United States Patent [19]

Watkins, III et al.

[11] 4,350,648

[45] Sep. 21, 1982

[54] FLOATING AERATOR

[76] Inventors: William L. Watkins, III, Rte. 1, Box 223, Lexington, S.C. 29072; Thurston L. Chavis, Jr., Rte. 1, Box 395A, Chapin, S.C. 22036; George L. Fuchsluger, 22 Tipton Cir., Irmo, S.C. 29063

[21] Appl. No.: 279,231

[22] Filed: Jun. 30, 1981

[51] Int. Cl.³ .............................................. B01F 3/04
[52] U.S. Cl. ................................ 261/120; 210/242.2; 239/182; 261/91
[58] Field of Search .................... 261/91, 120, 70, 80, 261/DIG. 47, DIG. 79; 210/219, 242.2; 248/74 R; 239/182

[56] References Cited

U.S. PATENT DOCUMENTS

| 3,497,185 | 2/1970 | Dively | 210/242.2 X |
| 3,669,422 | 6/1972 | Nogaj | 261/120 X |
| 3,802,676 | 4/1974 | Thayer | 261/122 |
| 3,814,393 | 6/1974 | Malmgren | 261/80 |
| 3,836,130 | 9/1974 | Earhart et al. | 261/120 X |
| 3,856,272 | 12/1974 | Ravitts | 210/242.2 X |
| 3,865,909 | 2/1975 | Cramer, Jr. | 261/120 X |
| 4,070,423 | 1/1978 | Pierce | 261/120 X |

Primary Examiner—Richard L. Chiesa
Attorney, Agent, or Firm—B. P. Fishburne, Jr.

[57] ABSTRACT

A floating aerator for a body of water includes a motor and deflector cone assembly whose connecting rods are adjustably secured to angle support feet which are stably seated in recesses formed in the top of a float body. The device is efficient and economical to manufacture.

2 Claims, 5 Drawing Figures

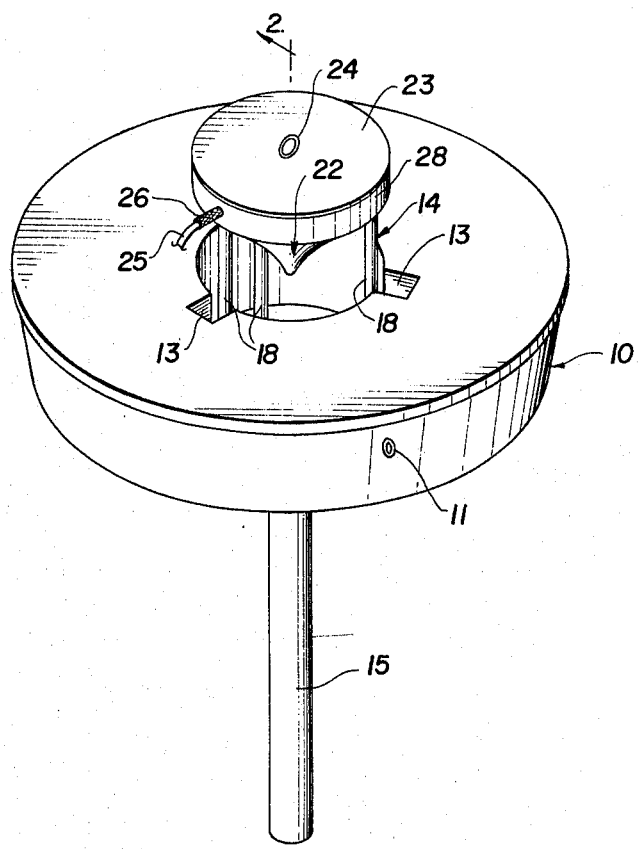
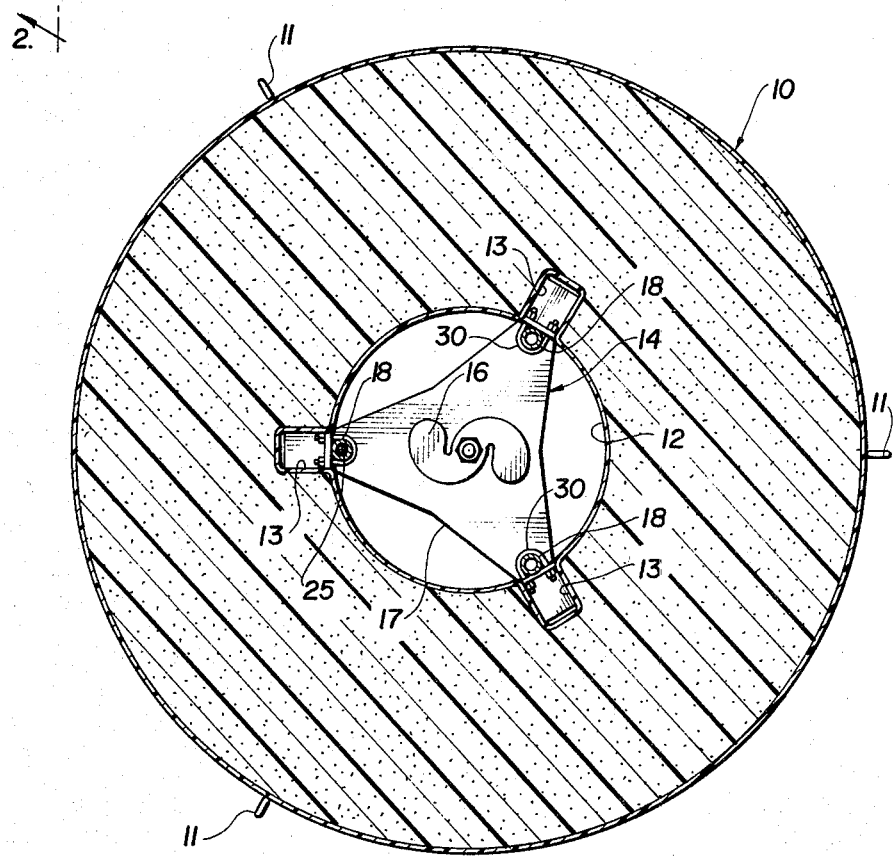

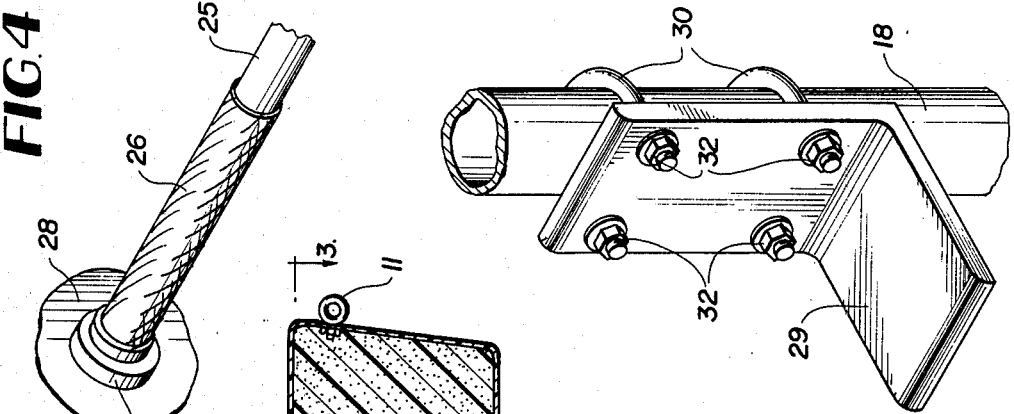
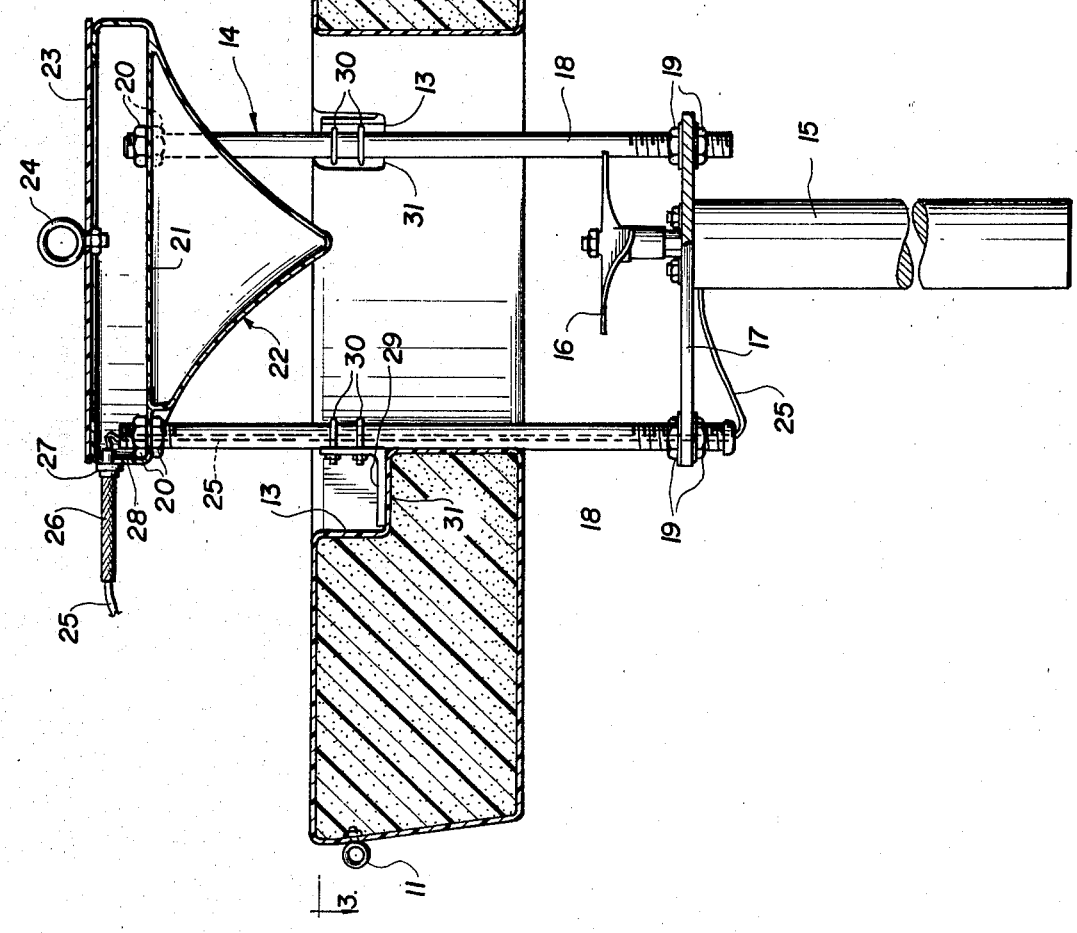

FLOATING AERATOR

BACKGROUND OF THE INVENTION

The invention relates to improvements in that type of flotation aerator disclosed in U.S. Pat. No. 3,865,909. More particularly, the invention seeks to provide an aerator which is less expensive to manufacture than the prior art device and which has a greater range of adjustability particularly in terms of the vertical adjustment of the motor and deflector cone assembly relative to the float body.

Yet another object is to provide a floating aerator having significantly fewer parts than the prior art.

Other features and advantages of the invention will become apparent during the course of the following description.

BRIEF DESCRIPTION OF THE DRAWINGS

FIG. 1 is a perspective view of a floating aerator according to the invention.

FIG. 2 is an enlarged central vertical section through the aerator taken on line 2—2 of FIG. 1.

FIG. 3 is a horizontal section taken on line 3—3 of FIG. 2.

FIG. 4 is a fragmentary perspective view of a motor cable connection.

FIG. 5 is a fragmentary perspective view of a support foot and associated parts.

DETAILED DESCRIPTION

Referring to the drawings in detail wherein like numerals designate like parts, the aerator comprises a preferably circular float body 10 having circumferentially spaced tethering eyes 11 thereon for securing the aerator at a desired location by means of ropes, not shown. The float body 10 has a central through bore 12 and is provided in its top face with three circumferentially spaced recesses 13, the bottom walls of which serve as seats for support feet of a motor and deflector cone assembly 14.

The assembly 14 comprises a vertical axis electric motor 15 of the type shown in U.S. Pat. No. 3,865,909, the motor shaft driving a propeller 16 at its upper end. The motor 15 is attached to a mounting plate 17 having three circumferentially spaced arms shown in FIG. 3 and each of these arms is apertured to receive a suspension rod 18 held by clamping nuts 19 on the plate 17, the rods being threaded to receive these nuts.

The suspension rods 18 project above the float body 10 and their upper ends are similarly attached by nuts 20 to the horizontal wall 21 of a water deflector cone 22 which is coaxial with the propeller 16. The deflector cone has a lid 23 suitably fixed thereon and equipped with a center lifting eye 24.

A power cable 25 for motor 15 extends through one rod 18 and at the top of this rod is held against longitudinal displacement by a Chinese finger trap sleeve 26 secured to a fitting 27 in turn anchored to the side wall 28 of deflector cone 22.

The assembly 14, which is unitary, is removably and adjustably supported on the float body 10 by preferably three angle feet 29 clamped by pairs of U-bolts 30 to the adjacent suspension rods 18. The horizontal webs of feet 29 rest stably on the bottom walls 31 of float body recesses 13, and the vertical side walls of these recesses prevent relative rotation or horizontal movement between the float body 10 and the assembly 14.

By loosening and retightening nuts 32 of the U-bolts 30, the suspension rods 18 and the entire assembly 14 can be adjusted vertically relative to the float body 10. The arrangement of the feet 29, recesses 13 and U-bolts 30 is a key feature of the invention over the prior art.

As described in U.S. Pat. No. 3,865,909, the propeller 16 when in operation drives water upwardly against the deflector cone 22 which deflects and disperses the water outwardly radially in all directions to aerate it.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A floating aerator comprising a float body having a central through opening and having a plurality of circumferentially spaced recesses in its top face, said recesses having substantially level bottom walls and spaced substantially vertical side walls rising from the bottom walls of the recesses, a motor and deflector cone assembly including circumferentially spaced substantially vertical suspension rods corresponding in number to the recesses and being disposed in the through opening of the float body and projecting above and below the float body, a deflector cone fixedly secured to the tops of the suspension rods and disposed at least in part above the top of the float body, a motor and impeller unit secured to the bottom of the suspension rods in coaxial relationship with the deflector cone and being spaced a predetermined distance therefrom, a plurality of substantially L-shaped support feet for said assembly corresponding in number and circumferential spacing to said recesses and suspension rods and being received removably in the recesses and resting on the bottom walls of the recesses between the vertical side walls of the recesses, the vertical side walls preventing relative rotation of said assembly and float body around a vertical axis, and U-bolts embracing the interior sides of said suspension rods and having outer ends secured to vertical webs of the L-shaped support feet within said recesses, whereby said feet are clampingly locked to said suspension rods and able to bear the weight of said assembly and to transmit such weight to the float body through the bottom walls of the recesses.

2. A floating aerator as defined in claim 1, and the recesses, suspension rods and feet being three in number in circumferentially equidistantly spaced relationship, and screw-threaded means adjustably connecting the outer ends of the U-bolts to said vertical webs, whereby the suspension rods can be vertically adjusted upwardly or downwardly on the float body and locked securely in any chosen adjusted position.

* * * * *